(12) United States Patent  
Tsai et al.

(10) Patent No.: US 7,796,214 B2
(45) Date of Patent: Sep. 14, 2010

(54) LIQUID CRYSTAL DISPLAY HAVING FLEXIBLE PRINTED CIRCUIT SANDWICHED BETWEEN LIQUID CRYSTAL PANEL AND LIGHT GUIDE PLATE THEREOF

(75) Inventors: Cheng-Feng Tsai, Miao-Li (TW); Cheng-Fan Chang, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 156 days.

(21) Appl. No.: 12/074,833

(22) Filed: Mar. 5, 2008

(65) Prior Publication Data

US 2008/0218661 A1 Sep. 11, 2008

(30) Foreign Application Priority Data

Mar. 5, 2007 (TW) .............................. 96203591 U

(51) Int. Cl.
G02F 1/1335 (2006.01)
G02F 1/1345 (2006.01)
(52) U.S. Cl. .......................................... 349/65; 349/150
(58) Field of Classification Search ................ 349/65, 349/150
See application file for complete search history.

(56) References Cited

U.S. PATENT DOCUMENTS

| 6,552,718 | B2 | 4/2003 | Ahn et al. |
| 7,495,738 | B2* | 2/2009 | Okuda ......................... 349/150 |
| 7,559,684 | B2* | 7/2009 | Okuda ......................... 362/631 |
| 7,570,321 | B2* | 8/2009 | Takahashi et al. ............. 349/65 |
| 2006/0164349 | A1* | 7/2006 | Hu ................................ 345/84 |
| 2007/0008457 | A1* | 1/2007 | Takahashi et al. ............. 349/64 |
| 2007/0019275 | A1* | 1/2007 | Okuda ......................... 359/265 |
| 2007/0046884 | A1* | 3/2007 | An et al. ...................... 349/151 |
| 2007/0171346 | A1* | 7/2007 | Chang et al. ................. 349/150 |
| 2008/0158470 | A1* | 7/2008 | Chung et al. ................. 349/58 |

* cited by examiner

Primary Examiner—K. Cyrus Kianni
(74) Attorney, Agent, or Firm—Wei Te Chung

(57) ABSTRACT

A liquid crystal display includes a liquid crystal panel and a backlight module parallel to the liquid crystal panel. The backlight module includes a light guide plate, a light source and a flexible printed circuit. The light guide plate includes a light incident surface. The light source is provided adjacent to the light incident surface of the light guide plate. The flexible printed circuit includes a light source driving end. The light source driving end is electrically connected with the light source. The light source driving end is bent and is sandwiched between the liquid crystal panel and the light guide plate. The light source driving end abuts the light guide plate.

15 Claims, 5 Drawing Sheets

LIQUID CRYSTAL DISPLAY HAVING FLEXIBLE PRINTED CIRCUIT SANDWICHED BETWEEN LIQUID CRYSTAL PANEL AND LIGHT GUIDE PLATE THEREOF

FIELD OF THE INVENTION

The present invention relates to a liquid crystal display (LCD) having a flexible printed circuit sandwiched between a liquid crystal panel and a light guide plate thereof.

BACKGROUND

Liquid crystal displays (LCDs) are commonly used as display devices for compact electronic apparatuses. This is not only because they provide good quality images with little power consumption, but also because they are very thin.

Referring to FIG. 5, a typical liquid crystal display 500 includes a liquid crystal panel 510, a backlight module 520, a plastic frame 530, a flexible printed circuit 540, a bottom tray 550, a first anisotropic conductive film (not shown), a second anisotropic conductive film (not shown), and a printed circuit board (not shown). The bottom tray 550 defines a gap 551. The liquid crystal panel 510 includes a first substrate 511, a second substrate 512 generally facing the first substrate 511, a liquid crystal layer 513 sandwiched between the first substrate 511 and the second substrate 512, and a driving integrated circuit (IC) 514. The second substrate 512 includes a main portion 5121 and an extending portion 5122. The main portion 5121 of the second substrate 512 is attached with the first substrate 511. The extending portion 5122 extends outward from the main portion 5121. A plurality of conductive lines (not labeled) are disposed on an upper surface of the extending portion 5122. The driving IC 514 is electrically connected with the conductive lines via the first anisotropic conductive film.

The backlight module 520 includes a reflective film 521, a light guide plate 522, an optical film assembly 523, a light-blocking tape 524, and a plurality of light sources 525. The reflective film 521, the light guide plate 522 and the optical film assembly 523 are arranged in that order from bottom to top. The light guide plate 522 includes a light incident surface 5221. The light sources 525 are located adjacent to the light incident surface 5221 of the light guide plate 522. The light sources 525 can be point light sources such as light emitting diodes.

The light-blocking tape 524 includes a first portion 5241, and a second portion 5242 integrated with the first portion 5241. The first portion 5241 is frame-shaped. The second portion 5242 is strip-shaped. The first portion 5241 is configured for making peripheral edges of the optical film assembly 523 adhere to peripheral edges of the main portion 5121 of the second substrate 512, and for preventing light beams from transmitting through the peripheral edges of the main portion 5121 of the second substrate 512. The second portion 5242 is attached to a lower surface of the extending portion 5122 of the second substrate 512 for shielding light beams.

The flexible printed circuit 540 includes a panel driving end 541, a light source driving end 542, and an external connecting end 543. The panel driving end 541 is electrically connected with the conductive lines on the extending portion 5122 of the second substrate 512 via the second anisotropic conductive film. Because the conductive lines are also electrically connected with the driving IC 514, the panel driving end 541 of the flexible printed circuit 540 is thus electrically connected with the driving IC 514. The panel driving end 541 provides a plurality of panel driving signals to the driving IC 514 so that the liquid crystal panel 510 displays images.

Referring also to FIG. 6 and FIG. 7, the plastic frame 530 and the bottom tray 550 cooperatively form an accommodating space to accommodate the reflective film 521, the light guide plate 522, the optical film assembly 523, the light-blocking tape 524 and the liquid crystal panel 510, in that order from bottom to top. The flexible printed circuit 540 is bent such that the light source driving end 542 of the flexible printed circuit 540 is sandwiched between the light sources 525 and the bottom tray 550. The light source driving end 542 is electrically connected with the light sources 525, and is configured to provide working voltages for the light sources 525. The external connecting end 543 extends through the gap 551 of the bottom tray 550, and is welded on the printed circuit board for receiving working voltages of the liquid crystal panel 510 and the light sources 525.

As described above, the flexible printed circuit 540 is bent such that the light source driving end 542 of the flexible printed circuit 540 is sandwiched between the light sources 525 and the bottom tray 550. Since the flexible printed circuit 540 is bent and under tension, the light source driving end 542 thereof occasionally moves downwardly toward the bottom tray 550. When this happens, the light sources 525 typically do not face the light incident surface 5221 of the light guide plate 522 properly. Accordingly, some of the light beams emitted by the light sources 525 leak out and cannot reach the light incident surface 5221 of the light guide plate 522. Thus a light utilization ratio of the liquid crystal display 500 may be unsatisfactorily low.

What is needed, therefore, is a liquid crystal display that can overcome the above-described deficiencies.

SUMMARY

In one embodiment, a liquid crystal display includes a liquid crystal panel and a backlight module parallel to the liquid crystal panel. The backlight module includes a light guide plate, a light source and a flexible printed circuit. The light guide plate includes a light incident surface. The light source is provided adjacent to the light incident surface of the light guide plate. The flexible printed circuit includes a light source driving end. The light source driving end is electrically connected with the light source. The light source driving end is bent and is sandwiched between the liquid crystal panel and the light guide plate. The light source driving end abuts the light guide plate.

Other novel features and advantages will become more apparent from the following detailed description of preferred and exemplary embodiments when taken in conjunction with the accompanying drawings. In the drawings, all the views are schematic.

DETAILED DESCRIPTION OF PREFERRED EMBODIMENTS

Reference will now be made to the drawings to describe the preferred embodiments in detail.

Figure 1:
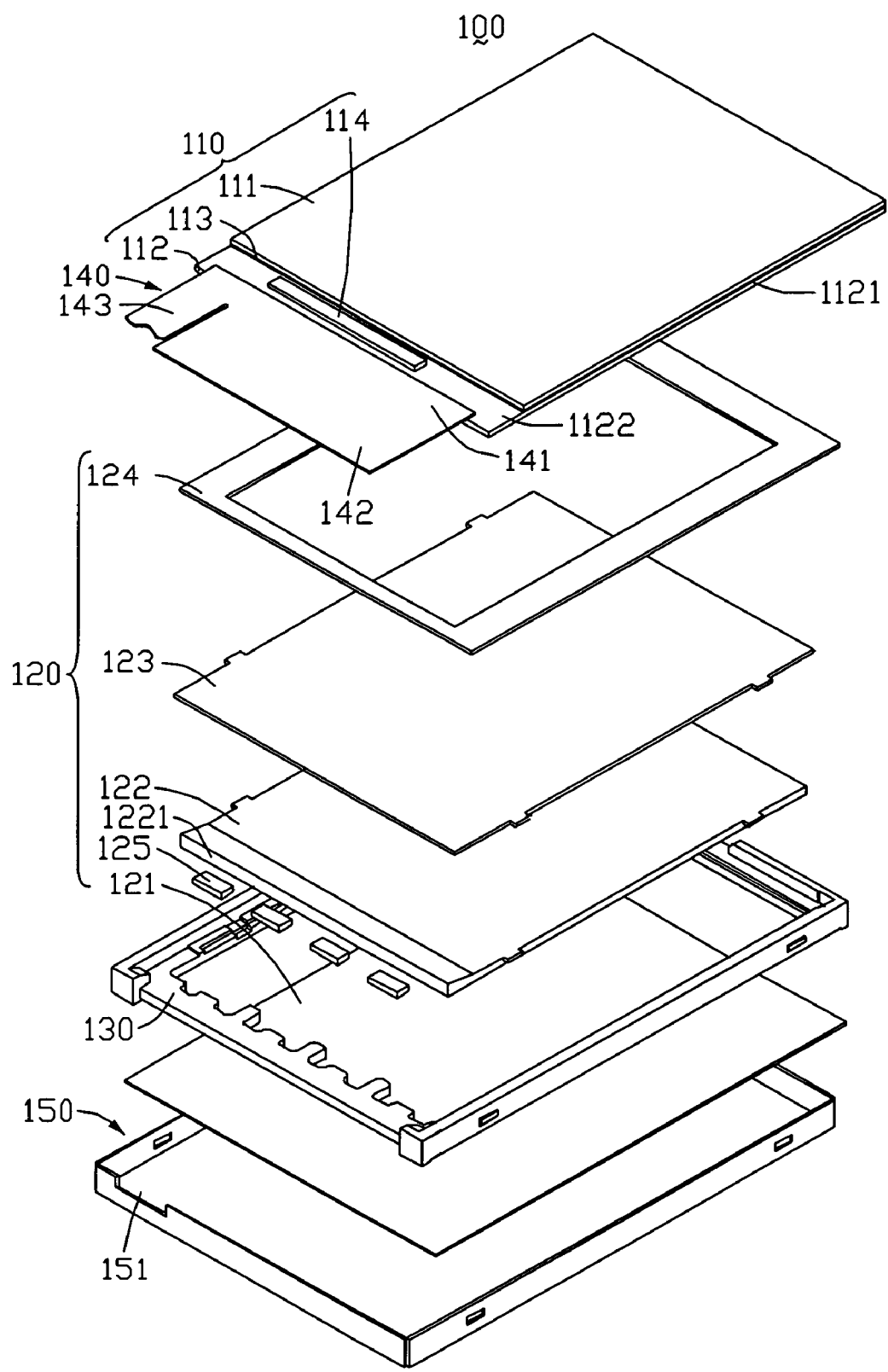
FIG. 1 is an exploded, isometric view of a liquid crystal display according to an exemplary embodiment of the present invention.

Referring to FIG. 1, a liquid crystal display 100 according to an exemplary embodiment of the present invention is shown. The liquid crystal display 100 includes a liquid crystal panel 110, a backlight module 120, a plastic frame 130, a flexible printed circuit 140, a bottom tray 150, a first anisotropic conductive film (not shown), a second anisotropic conductive film (not shown), and a printed circuit board (not shown). The bottom tray 150 defines a gap 151.

The liquid crystal panel 110 includes a first substrate 111, a second substrate 112 facing the first substrate 111, a liquid crystal layer 113 sandwiched between the first substrate 111 and the second substrate 112, and a driving IC 114. The second substrate 112 includes a main portion 1121 and an extending portion 1122. The main portion 1121 of the second substrate 112 is attached with the first substrate 111. The extending portion 1122 extends outwardly from the main portion 1121. A plurality of conductive lines are disposed on an upper surface of the extending portion 1122. The driving IC 114 is electrically connected with the conductive lines via the first anisotropic conductive film.

The backlight module 120 includes a reflective film 121, a light guide plate 122, an optical film assembly 123, a light-blocking tape 124, and a plurality of light sources 125. The reflective film 121, the light guide plate 122 and the optical film assembly 123 are arranged in that order from bottom to top. The light guide plate 122 includes a light incident surface 1221. A part of the light guide plate 122 adjacent and including the light incident surface 1221 is wedge-shaped, and this part of the light guide plate 122 is defined as a wedge-shaped portion (not labeled). A height of the wedge-shaped portion of the light guide plate 122 is greater than that of a main portion of the light guide plate 122. The light sources 125 can be point light sources such as light emitting diodes.

The light-blocking tape 124 is frame-shaped, and is configured for making peripheral edges of the optical film assembly 123 adhere to peripheral edges of the main portion 1121 of the second substrate 112, and for preventing light beams from transmitting through the peripheral edges of the main portion 1121 of the second substrate 112.

The flexible printed circuit 140 includes a panel driving end 141, a light source driving end 142, and an external connecting end 143. The light sources 125 are disposed on the light source driving end 142. The panel driving end 141 is electrically connected with the conductive lines of the extending portion 1122 of the second substrate 112 via the second anisotropic conductive film. Thus, the panel driving end 141 is electrically connected with the driving IC 114. The panel driving end 141 provides a plurality of driving signals to the driving IC 114 so that the liquid crystal panel 110 displays images.

Figure 2:
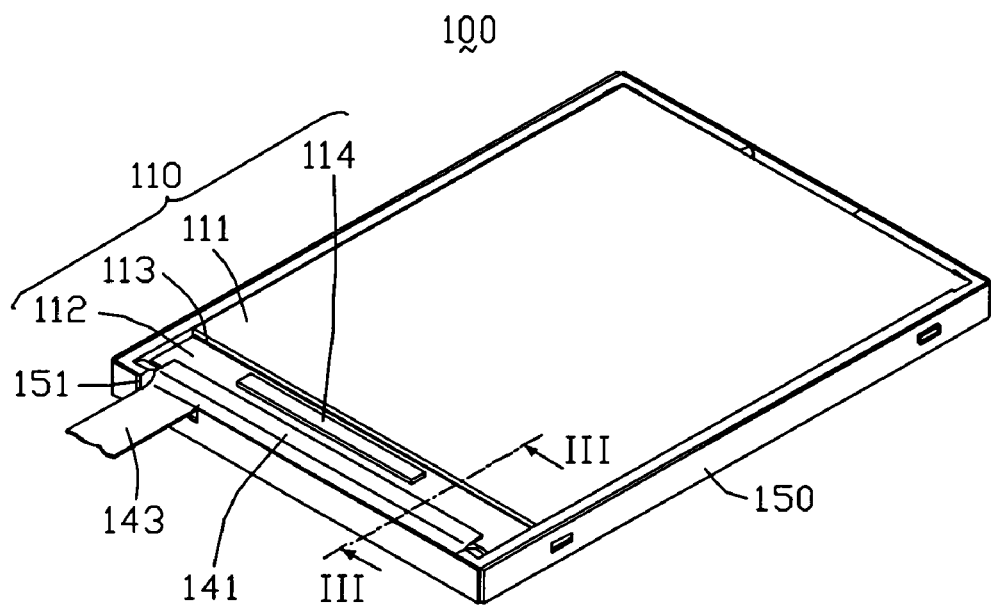
FIG. 2 is an assembled view of the liquid crystal display of FIG. 1.
Figure 3:
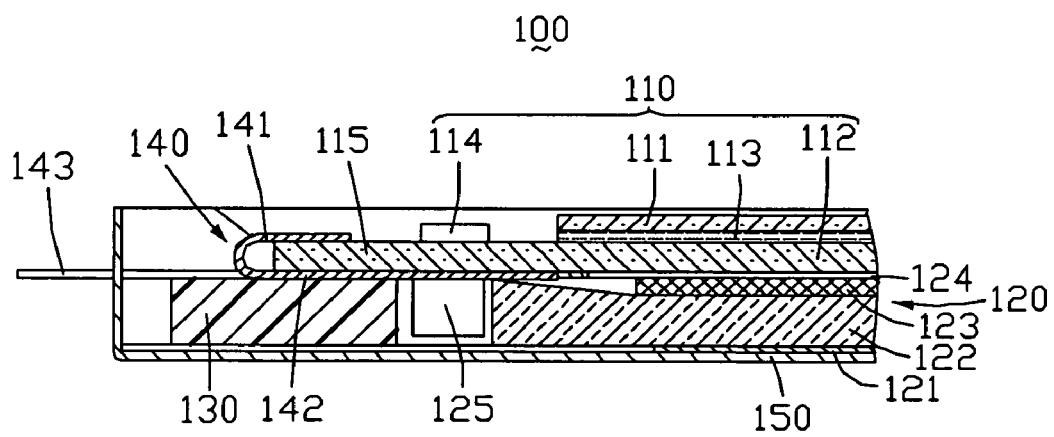
FIG. 3 is an enlarged, cross-sectional view taken along line III-III of FIG. 2.

Referring also to FIG. 2 and FIG. 3, the flexible printed circuit 140 is bent, such that the light source driving end 142 of the flexible printed circuit 140 is sandwiched between the second substrate 112 and the wedge-shaped portion of the light guide plate 122. A tip portion of the light source driving end 142 abuts an upper surface of the wedge-shaped portion of the light guide plate 122. The light sources 125 are welded on a lower surface of the light source driving end 142 of the flexible printed circuit 140, so that the light sources 125 face the incident surface 1221 of the light guide plate 122 properly. The light source driving end 142 provides a plurality of working voltages to the light sources 125.

The light source driving end 142 covers a lower surface of the extending portion 1122 of the second substrate 112. The light source driving end 142 prevents light beams from reaching the extending portion 1122. The external connecting end 143 extends through the gap 151 of the bottom tray 150, and is welded on the printed circuit board for receiving panel driving signals of the liquid crystal panel 110 and working voltages of the light sources 125.

Unlike with a conventional liquid crystal display, the light source driving end 142 of the flexible printed circuit 140 is sandwiched between the second substrate 112 and the light guide plate 122. The tip portion of the light source driving end 142 abuts the wedge-shaped portion of the light guide plate 122. Thereby, the light source driving end 142 does not move downwardly toward the bottom tray 150, even though the flexible printed circuit 140 is bent and under tension. Thus, the light sources 125 disposed on the light source driving end 142 reliably face the incident surface 1221 of the light guide plate 122 properly. A light utilization ratio of the liquid crystal display 100 is consistent and thereby improved. Furthermore, no light-blocking tape 124 needs to be placed on the lower surface of the extending portion 1122 of the second substrate 112. Therefore a cost of the liquid crystal display 100 can be reduced.

Figure 4:
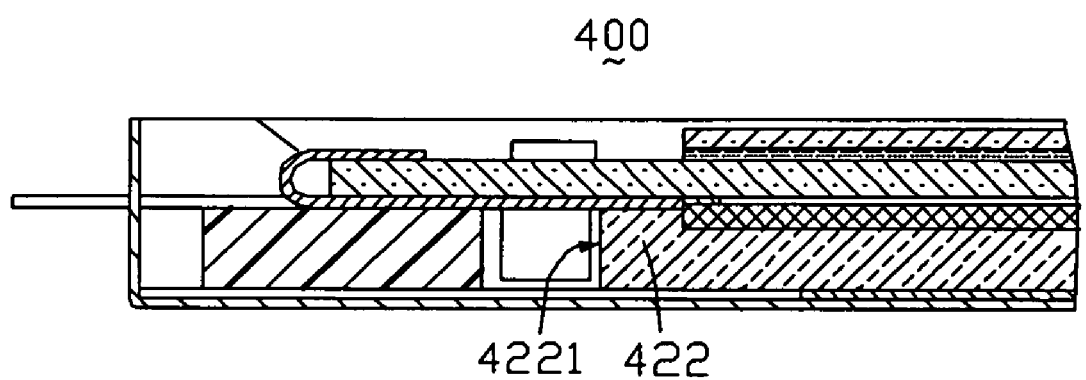
FIG. 4 is an enlarged, cross-sectional view of a liquid crystal display according to a second embodiment of the present invention.
Figure 5:
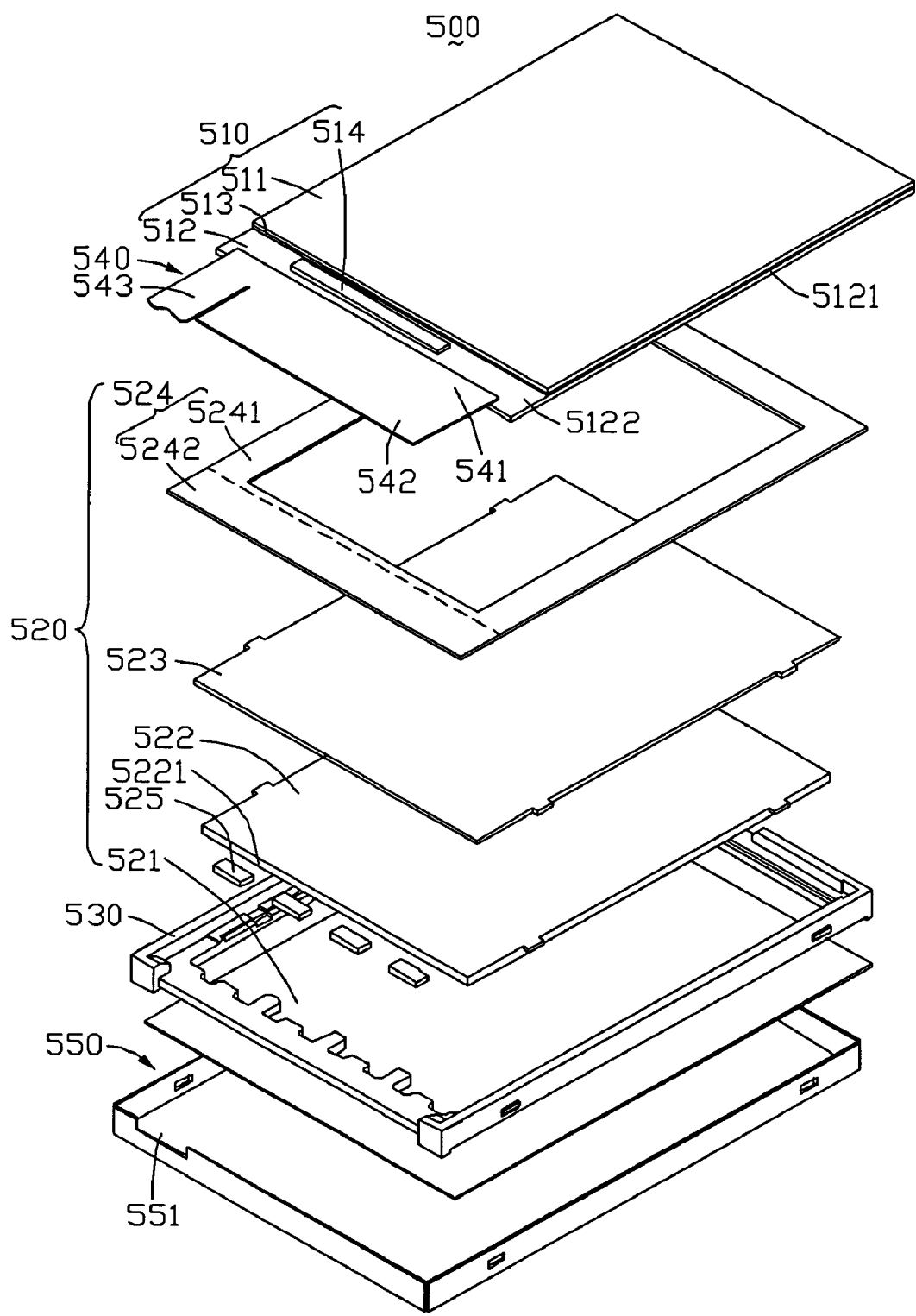
FIG. 5 is an exploded, isometric view of a conventional liquid crystal display.
Figure 6:
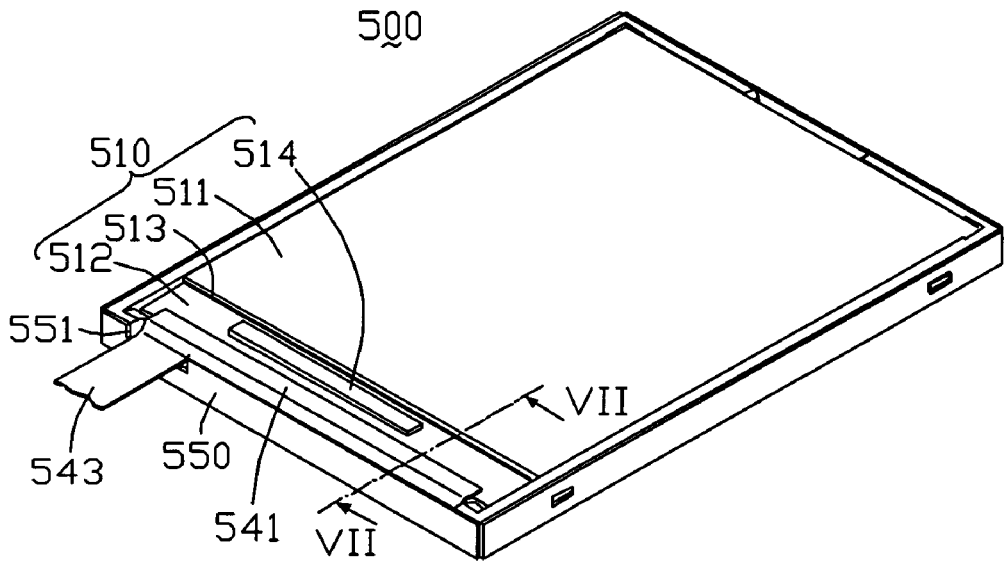
FIG. 6 is an assembled view of the liquid crystal display of FIG. 4.
Figure 7:
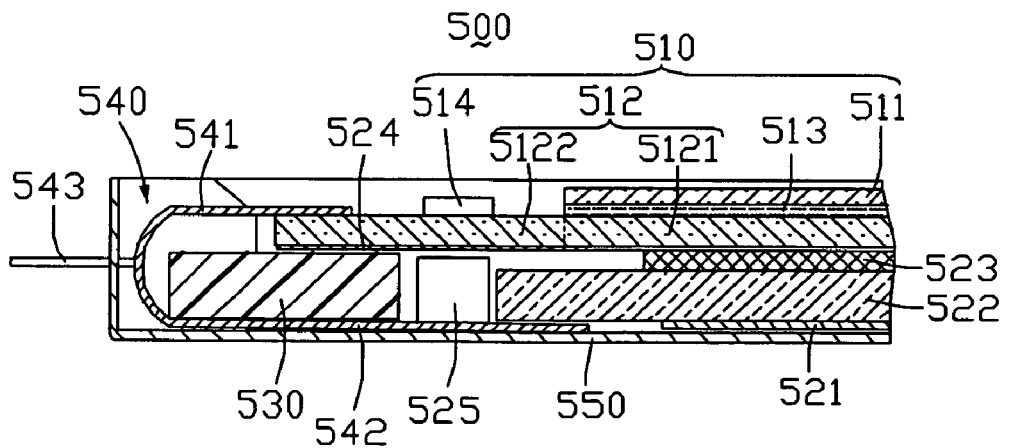
FIG. 7 is an enlarged, cross-sectional view taken along line VI-VI of FIG. 5.

Referring to FIG. 4, a liquid crystal display 400 according to a second embodiment of the present invention is similar to the liquid crystal display 100. However, a part of a light guide plate 422 adjacent and including a light incident surface 4221 can be step-shaped instead of wedge-shaped. For example, the step-shaped part can include a single step. In such case, a height (thickness) of the step-shaped part is greater than that of a main portion of the light guide plate 422.

In alternative embodiments, light source driving ends of the flexible printed circuits can be covered with light-blocking material for absorbing light beams incident thereto. The light-blocking material can for example be black epoxy-polyurethane.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A liquid crystal display comprising:
    a liquid crystal panel, the liquid crystal panel comprising a first substrate and a second substrate generally facing the first substrate, the second substrate comprising a main portion and an extending portion, the main portion being attached to the first substrate, the extending portion extending from the main portion and being exposed beyond the first substrate;
    a backlight module, the backlight module being parallel to the liquid crystal panel, the backlight module comprising:
        a light guide plate comprising a light incident surface; and
        a light source provided adjacent to the light incident surface of the light guide plate; and
    a flexible printed circuit comprising a light source driving end, the light source driving end being bent and sandwiched between the extending portion of the second substrate and the light guide plate, covering a surface of the extending portion generally facing the light guide plate, and abutting the light guide plate and being electrically connected with the light source.

2. The liquid crystal display as claimed in claim 1, wherein the flexible printed circuit further comprises an external connecting end and a panel driving end, the external connecting end being configured to electrically connect with an external circuit, the panel driving end being electrically connected with the liquid crystal panel.

3. The liquid crystal display as claimed in claim 2, wherein the external connecting end is configured for providing liquid crystal panel driving signals to the liquid crystal panel and providing working voltages to the light source.

4. The liquid crystal display as claimed in claim 3, wherein the external circuit is a printed circuit board.

5. The liquid crystal display as claimed in claim 1, wherein the surface of the extending portion facing the light guide plate is covered with light-blocking material.

6. The liquid crystal display as claimed in claim 5, wherein the light-blocking material is made of black epoxy-polyurethane.

7. The liquid crystal display as claimed in claim 1, wherein a surface of the extending portion facing the first substrate is covered with light-blocking material.

8. The liquid crystal display as claimed in claim 1, wherein the backlight module further comprises a frame-shaped light-blocking tape, the light-blocking tape being attached to peripheral edges of the main portion of the second substrate of the liquid crystal panel for shielding light beams.

9. The liquid crystal display as claimed in claim 1, wherein the light source driving end is covered with light-blocking material for absorbing light beams incident thereto.

10. The liquid crystal display as claimed in claim 1, wherein the light source is welded on the light source driving end of the flexible printed circuit, the light source driving end being configured for providing working voltages to the light source.

11. The liquid crystal display as claimed in claim 10, wherein the light source comprises a plurality of point light sources.

12. The liquid crystal display as claimed in claim 1, wherein the light guide plate comprises a main portion, and another portion adjacent and including the light incident surface, said another portion being wedge-shaped.

13. The liquid crystal display as claimed in claim 12, wherein a height of said another portion is greater than that of the main portion.

14. The liquid crystal display as claimed in claim 1, wherein the light guide plate comprises a portion including the light incident surface, said another portion being step-shaped.

15. The liquid crystal display as claimed in claim 14, wherein a height of said another portion is greater than that of the main portion.

* * * * *